Feb. 28, 1956 H. WELKER 2,736,858

CONTROLLABLE ELECTRIC RESISTANCE DEVICES

Filed July 8, 1952 2 Sheets-Sheet 1

Inventor:
Heinrich Welker
By
C. M. Avery
Attorney

CONTROLLABLE ELECTRIC RESISTANCE DEVICES

Filed July 8, 1952 2 Sheets-Sheet 2

Inventor:
Heinrich Welker
By C. M. Avery
Attorney

United States Patent Office 2,736,858

Patented Feb. 28, 1956

2,736,858

CONTROLLABLE ELECTRIC RESISTANCE DEVICES

Heinrich Welker, Erlangen (Bay), Germany, assignor to Siemens-Schuckertwerke Aktiengesellschaft, Erlangen, Germany, a corporation of Germany Application July 8, 1952, Serial No. 297,788

Claims priority, application Germany July 12, 1951

19 Claims. (Cl. 323—94)

My invention relates to controllable electric resistance devices, and particularly to devices whose essential component is a solid semiconductor body.

Semiconductors, whose resistive behavior is not in conformity with Ohm's law, have been used for various electrical purposes. In copper oxide or selenium rectifiers, for instance, the non-linear current-voltage characteristic of the semiconductive material is utilized to produce a valve effect. The asymmetrical conductance of such rectifiers is due to a boundary layer, the so-called Schottky barrier, which forms itself within the semiconductor, immediately adjacent to the metallic contact electrode, in a thickness of $10^{-6}$ to $10^{-4}$ cm. The extremely slight thickness of the barrier layer imposes a severe limitation upon the obtainable valve effect as it limits the permissible inverse voltage of the rectifier.

Attempts at building, in analogy to electronic tubes, a control grid into the barrier layer encounter unsurmountable difficulties also due to the extreme thinness of the barrier. Although it is possible to avoid these difficulties by the so-called capacitive control of thin semiconductor layers, the electric currents, passing longitudinally through these layers, are so minute ($10^{-9}$ to $10^{-6}$ amps.) that the capacitive control has so far remained without technological applications even for low-current (communication) purposes.

An advance was made when investigations of the rectifying properties of germanium led to the discovery that not only the electrons but also injected defect electrons (also called "holes") may contribute to the unipolar conductance of the boundary layers. Since the holes have a charge polarity opposed to that of the electrons, electrons and holes may become crowded within the same spacial region of a semiconductor crystal without resulting in a space charge. Hence, the thickness of the barrier layer is not limited by an electric space charge. Instead, the barrier thickness, according to W. Shockley, is defined by the diffusion length L, determined by the electron and hole diffusion in accordance with the formula:

$$L = \sqrt{D \cdot \tau}$$

wherein D is the diffusion constant and $\tau$ the lifetime of an electron or hole. The diffusion length L may be $10^{-3}$ to $10^{-1}$ cm. for germanium. This relatively large thickness of the barrier layer explains the relatively high inverse voltage strength of germanium detectors and germanium $p$—$n$ junctions and also provides the possibility of locating a third electrode within the effective range of the barrier, thus permitting a control of currents between 1 and 100 milliamps with the known transistors.

It is an object of my invention to further improve semiconductor devices generally of the above-mentioned type and to make them applicable for voltage or current ranges up to values far above those heretofore attained. More specifically, my invention aims at achieving such improvements which are based on boundary or barrier layers of substantially increased thickness. It is the object of my invention to devise semiconductor devices which, in conjunction with an increased current or voltage capacity, readily lend themselves for control and translating purposes in the widest sense, such as for adjusting, varying, regulating, detecting, amplifying, rectifying, limiting, making or breaking an electric current or voltage magnitude.

Before describing how these objects are accomplished by my invention, it seems appropriate to mention that the terminology used in this specification is in accordance with the one evolved from the developments of the last decade in this art and used, for instance, in the book Electrons And Holes In Semiconductors by W. Shockley, 1950, D. Van Nostrand Company, New York. If desired, this book may also be drawn upon for a more complete description of the prior art and the phenomena mentioned in the foregoing.

According to a feature of my invention, I subject an intrinsic semiconductor, to be used as a resistive member in an electric circuit and traversed by current within an electric field when so used, to the effect of a magnetic field which extends in the semiconductor transversely or perpendicularly to the electric field and produces in the semiconductor a magnetic barrier layer with a controlling effect upon the electric resistance of the semiconductor; and I control this resistance by imposing a variation upon the magnetic field, or upon the electric field, or upon both fields.

In an intrinsic semiconductor, as here to be understood, the electrons (excess electrons) and holes (defect electrons), in the thermal equilibrium, have respective concentrations of the same order of magnitude; that is, the concentration of the electrons is at most about 10 times the concentration of the holes, or vice versa. A semiconductor, in which a greatly preponderant electron concentration is accompanied by a small but still noticeable hole concentration, or vice versa, is considered still to belong to the intrinsic type with regard to this invention. However, I have found it preferable to use substantially intrinsic semiconductors, having about balanced, or only little different electron and hole concentrations up to the above-mentioned approximate limit.

The invention will be further explained in conjunction with the drawings, in which.

Figure 1:
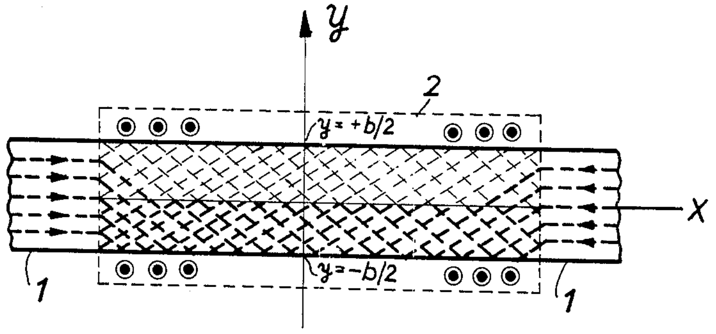
Fig. 1 shows schematically a diagram of a semiconductor operating as a resistive circuit element and subjected to electric and magnetic fields in accordance with the invention.

In Fig. 1, an electronic semiconductor 1 is shown with reference to two coordinate directions X and Y. Assume that the semiconductor is traversed by electric current flowing in the direction X and that it is also subjected to a magnetic field issuing from the pole 2 of a magnet in a direction (Z) which extends perpendicularly to the plane of illustration toward the observer, as is indicated by a few lines of force symbolically shown at 3 by encircled dots. Under these conditions, the current carriers, namely the electrons (excess electrons) as well as the holes (defect electrons), are diverted within the range of the magnetic field toward the same side of the semiconductor along slanted paths as schematically represented by broken lines. Hence one side of the semiconductor becomes thinned out of electrons and holes while the other side becomes crowded. This is indicated in Fig. 1 by showing the slanted conductance lines heavier at the crowded side than at the thinned-out side of the semiconductor. This effect, as such, occurs also in a purely electron-conductive material without defect electrons. There, however, the crowding of the electrons at one side of the conductor is accompanied by the occurrence of surface charges which result in an electric counter field (Hall field) that soon puts an end to the crowding effect. This is not so with intrinsic semiconductors. Since electrons as well as holes are simultaneously brought to the same side of the semiconductor, the crowding does not produce a space charge and hence reaches a limit only when the gradients of the carrier density become so large that the magnetic forces are balanced by the counter forces of electron and hole diffusion.

On the crowded side of the semiconductor as well as on the thinned-out side, the electrons and holes are not in thermal equilibrium. Let $n_i$ denote the electron concentration (which is equal to the hole concentration) of an ideal intrinsic semiconductor, and let $n$ denote the actual electron concentration and $p$ the actual hole concentration, then on the crowded side $np>n_i^2$ and on the thinned-out side $np<n_i^2$, while at the thermal equilibrium $np$ would have to be equal to $n_i^2$. Besides, for electric neutrality, $n$ must be approximately equal to $p$.

It follows, that the thinned-out side, so to say, seeks to replenish its deficit in electron-hole pairs by thermal generation of electron-hole pairs, while the crowded side seeks to eliminate its excess in electron-hole pairs by recombination.

A quantitative investigation with certain metals which exhibit electron conductance as well as simultaneous hole conductance (as observed for instance, with "transition" metals such as platinum and palladium) has shown that, with the slight values of electric field strength applicable in metals, the magnetic forces exertable upon electrons and holes are so minute that the resulting changes in electron and hole concentrations are immediately obviated by thermal generation and recombination. In such metals, therefore, the electron concentration, as well as the hole concentration, is spacially constant and is everywhere equal to its equilibrium value and virtually not controllable by extraneous electric and magnetic fields.

This is different with intrinsic semiconductors where it is possible, due to the property of semiconductance (i. e. poor conductance in comparison with metals), to apply electric fields many orders of magnitude stronger than those experimentally realizable with metals. For instance, a calculation for semiconductive, well crystallized germanium shows that an electron-hole pair, drifting perpendicularly to an exterior electric field of 10 volts/cm. (readily produceable in germanium) and having a drift path perpendicular to a magnetic field directed at a right angle to the electric field and of 10,000 gauss field strength, may traverse a distance of 10 cm. before recombining.

Disregarding, at first, the generation of electron-hole pairs at the semiconductor surface on the thinned-out side, it will be recognized that the thickness of the thinned-out layer, defined by the condition that within it the electron-hole pair concentration is equal to $n_i$ or less, may readily be 1 cm. to 10 cm., neither of these values representing a lower or upper limit. In the following, this thinned-out layer is referred to as the "magnetic barrier layer" because it owes its existence to a magnetic field and has the electric neutrality peculiar to magnetic phenomena, in contrast to the Schottky barrier layer characterized by electric space charges. A conspicuous and advantageous distinction of the magnetic barrier layer over Schottky's barrier layer on the one hand, and Shockley's diffusion layer on the other hand, is its comparatively huge thickness, a dimension of decisive significance for practical applications especially at relatively high voltages or relatively strong currents. The term "high voltage" is referred to the maximum inverse voltage which can be achieved with the selenium rectifier. While here only an inverse voltage of about 40 to 70 volts is obtained, nearly any voltage may be applied to the object of this invention, that is very small voltages as well as any higher voltages such as 1000 volts or more.

The term "heavy current" is referred to the maximum currents which can be achieved with the transistor and is to be understood as follows: In the new device the effective zone, that is the thinned-out layer ("magnetic barrier layer"), is considerably larger in its dimensions than the effective zone ($p$–$n$ junction) of the transistors known heretofore. From this it follows that in the new device the layers which are electrically effective and the electrodes can have considerably greater dimensions than in the case of the transistor and that therefore the total currents flowing through the device can be considerably higher than in the case of the transistor. Thus the new device permits currents of one ampere without special cooling measures while in the case of the transistor only currents of about 100 milliamps can flow.

Figure 2:
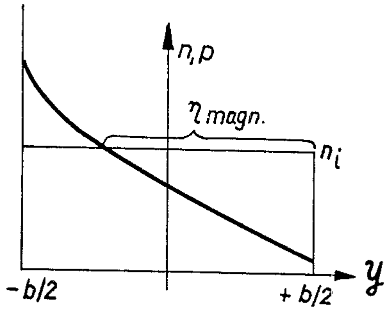
Figs. 2 to 4 are respective coordinate diagrams explanatory of the functioning of the semiconductor.
Figure 3:
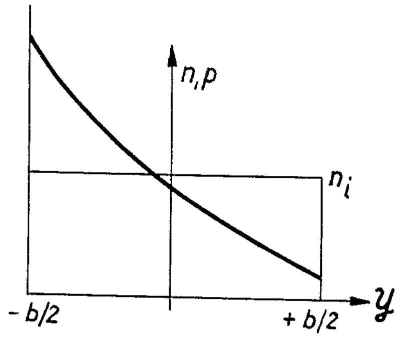
Figure 4:
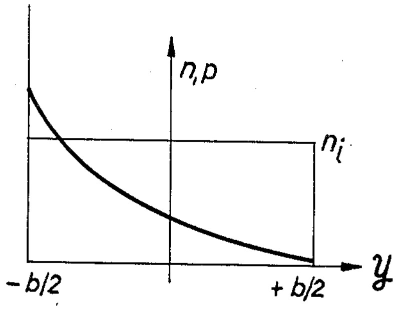

Designating in Fig. 1 the total thickness of the semiconductor in the Y-direction with $b$, the abscissa in each of the diagrams shown in Figs. 2 to 4 denotes the corresponding thickness, and the ordinate represents electron and hole concentrations. Fig. 2 shows the curve of the electron (or hole) concentration $n$ (or $p$) in the Y-direction perpendicular to the magnetic field direction Z. The thickness $n_{mag}$ of the layer depleted of electrons and holes is the magnetic barrier layer. This barrier-layer thickness increases with a decrease in the recombination, more accurately the volume recombination, of the electron-hole pairs, and hence is the larger the more closely the crystal lattice of the semiconductor approaches perfection. An appreciable recombination usually occurs at interfacial or grain boundaries. For that reason, and in accordance with another feature of the invention, the semiconductors consist preferably of single crystals to secure optimum results.

The course of the electron and hole concentrations in the Y-direction also depends upon the properties of the semiconductor surfaces at $$y=+\frac{b}{2}$$

and $$y=-\frac{b}{2}$$

(see Figs. 1 to 4). Fig. 3, for instance, represents the concentration curve for a complete absence of any volume and surface recombination and exhibits the characteristic of having an average pair concentration equal to the constant equilibrium concentration $n_i$. If the surface recombination differs from zero but the surface condition is equal at the two opposite sides of the semiconductor, the carrier concentration for a slight volume recombination follows a course as typified by Fig. 4. In this case, the maximum density on the recombination side cannot exceed the value $\sqrt{2}.n_i$, while at the generating side the value of $n$ may become much smaller than $n_i$. Hence, the average value of the concentration $n$ remains appreciably below $n_i$, and the formation of a magnetic barrier layer is accompanied by increased resistance of the semiconductor even in the direction of the electric primary current flow. A greatly excessive surface recombination, even in the absence of interfacial recombination, would obviate the formation of a magnetic barrier layer. This is because under thermal equilibrium conditions the recombination is equal to the thermal generation so that a surface with a large surface recombination at the thinned-out side would be capable of replenishing any number of electron-hole pairs and thus would maintain at $$y=+\frac{b}{2}$$

a marginal density practically equal to $n_i$. According to another feature of my invention, therefore, the surface of the semiconductor is subjected to a recombination-reducing surface treatment, for instance, to an anodic treatment in an electrolytic bath.

Generally, such an electric or electrolytic surface treatment produces an overall reduction in surface recombination. However, for making the average value of the electron-hole concentration in the Y-direction substantially smaller than the equilibrium value $n_i$, it is preferable to have a slight surface recombination at the thinned-out side accompanied by a strong surface recombination at the crowded side. According to another feature of my invention, therefore, the thinned-out side of the semiconductor is subjected to a recombination-reducing treatment, for instance, by electrolysis, while the crowded side is given a recombination-increasing surface treatment, for instance, by grinding and polishing.

As is to be seen from the above, a surface treatment can be applied so as to have different effects on the two respective sides of the crystal. It is of special importance to apply the surface treatment on the thinned-out side in such a manner that its principal effect consists in a fine disintegration of the disturbed crystalline surface layer. The term fine disintegration is meant to designate an attrition of the disturbed crystal surface layer without interfering with the crystal structure of the rest of the body. In addition to the above mentioned electrolysis in which the semiconductor preferably acts as anode it is also possible to etch the semiconductor body with a liquid attacking it, e. g. in the case of germanium with diluted caustic soda to which some hydrogen peroxide has been added.

Aside from the above-mentioned factors that affect the magnetic barrier layer, the particular choice of the crystalline intrinsic semiconductor material, of course, is of greatest significance. Since the magnitude of the magnetic forces imposed upon the electrons and holes is proportional to their velocity and since this velocity for a given electric field is proportional to the mobility of the carrier, it is preferable for producing the magnetic barrier effect to employ semiconductors of high electron or hole mobility. (Mobility in cm.$^2$/volt sec. is defined as being the veyocity in cm. per sec. of the carrier in an electric field of one volt per cm.). According to another feature of my invention, therefore, semiconductors are preferably used which consist of homopolar crystals with a mobility of at least 100 cm.$^2$/volt sec., for instance, the elements silicon, germanium or gray tin, or such crystalline compounds as indium antimonide (InSb), gallium antimonide (GaSb), aluminium antimonide (AlSb), indium arsenide (InAs) and others, as described in my copending application, Serial No. 275,785, filed March 10, 1952 for Semiconductor Devices and Methods of their Manufacture, assigned to the assignee of the present invention. With germanium, having an electron mobility of about 3,000 cm.$^2$/volt sec., the application of a magnetic field of 10,000 Gauss results in a magnetic force acting upon the electrons whose ratio to the electric force acting upon the electrons is equal to $3{,}000 \times 10{,}000 \times 10^{-8} = 0.3$.

Semiconductor devices according to the invention are applicable in various ways for controlling, regulating, rectifying and other translating purposes and to this end may be used in a large variety of circuit arrangements. One of the available possibilities according to the invention involves varying the thickness of the magnetic barrier layer by correspondingly varying the magnetic field acting upon the semiconductor body. A device of this kind is exemplified by the embodiment shown in Fig. 5. The semiconductor body, as an example, may have a thickness of 2 centimeters in the direction of the magnetic field, a length of 12 centimeters between the electrodes 17 and 18 and a width of 5 centimeters perpendicular to the first-named dimensions, i. e. perpendicular to the plane of illustration. These dimensions may also be used for the devices shown in the following figures.

Figure 5:
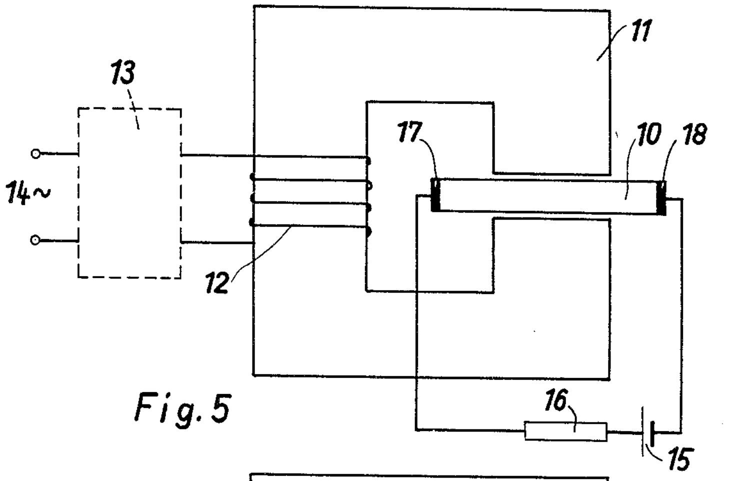
Figs. 5 to 8 show respective embodiments of semiconductor devices and pertaining respective circuit diagrams according to the invention.

According to Fig. 5 an elongated, rod or bar shaped electronic semiconductor 10, consisting preferably of a single crystal, is disposed between the poles of an electromagnet 11. The excitation coil 12 of the electromagnet is energized by variable current from a control or regulating circuit schematically shown at 13. In the illustrated embodiment the control circuit 13 is shown to have its input terminals connected to an alternating current source 14.

The device serves to control a load circuit in dependence upon the variations of the current flowing through the magnetic coil 12. The circuit to be controlled comprises a direct current source 15, an exterior resistor or load 16, and the semiconductor 10. The connection of the semiconductor 10 with the circuit is established through electrodes 17 and 18 which are intimately bonded to the axial end faces of the semiconductor body.

A device of the type shown in Fig. 5 may be operated as an amplifier which translates the variations of the controlling energy in the input circuit into corresponding, amplified variations in the output circuit. This will be understood on the basis of the explanations given in the foregoing. In accordance with the variations in the field strength of the magnet 11, the boundary between the thinned-out layer (magnetic barrier layer) and the crowded layer is varied as explained with reference to Fig. 1. The resistance of the semiconductor body 10 in the controlled circuit therefore varies accordingly and so does the current flowing through load 16.

Figure 6:
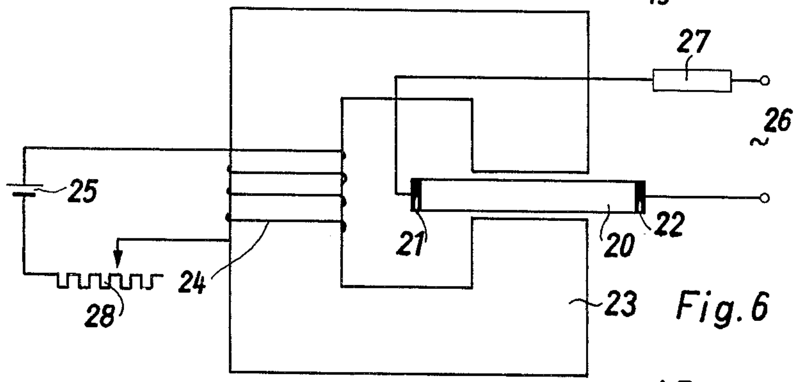

As mentioned, a device according to the invention may also be operated as a rectifier. An example of this kind is represented by the embodiment of Fig. 6. According to Fig. 6 the bar shaped semiconductor 20 carries on its axial end faces two respective electrodes 21 and 22, neither of which need form a Schottky barrier with the semiconductor material. The semiconductor 20 is subjected to the field of a magnet 23. This magnet may consist of a permanent magnet or, as illustrated, of an electromagnet whose coil 24 is energized from a direct current source 25 of constant voltage.

The alternating current to be rectified is supplied from an alternating current source 26 and is applied to the semiconductor 20 through the electrodes 21 and 22. The alternating-current circuit is shown to include a direct current load 27.

The device according to Fig. 6 operates as a valve or rectifier in such a manner that the current half waves of one polarity are permitted to pass through the semiconductor, while the half waves of the other polarity are substantially prevented from flowing through the semiconductor due to the greatly increased resistance then obtaining in the semiconductor. While the functioning of this rectifier will be understood from the explanations previously given, the following may be added. Assume that the field strength of the magnetic field acting upon the semiconductor body 20 is constant. Also assume that the semiconductor 20 is given a different surface treatment on the two longitudinal respective surfaces that are parallel to the magnetic field and parallel to the flow direction of the current. In Fig. 6 these two surfaces lie in the plane of illustration or, more accurately, are parallel thereto. For instance, one of the two surfaces is etched by anodic electrolysis and hence has a reduced surface recombination. The second surface, for instance, is ground and polished to a mirror-like finish and hence has an increased surface recombination. Due to the different surface properties, the semiconductor 20 is electrically asymmetrical relative to its center plane parallel to the two mentioned crystal surfaces. If such a semiconductor is connected to an alternating voltage supply through its electrodes 20, 22, shown in Fig. 6, a magnetic barrier layer can develop only at its (etched) side of reduced surface recombination but not at the opposite (polished) side. This means that only the half waves of one polarity of the alternating voltage result in the formation of the magnetic barrier layer but not the voltage half waves of the other polarity. Consequently, the half waves of the first polarity are blocked by the barrier layer while the half waves of the second polarity are permitted to pass. The undesired inverse current may be kept small by a corresponding choice of the dimensions and physical properties of the semiconductor body 20. If, as shown in Fig. 6, an electromagnet is used for providing the magnetic field, the direct current for the magnet coil 24 may be taken from the circuit of the semiconductor 20 since this circuit conducts rectified current.

Instead of a substantially constant magnetic field, a magnetic field of variable time characteristic may also be used in a device corresponding to Fig. 6. As an example, a resistor 28 for varying the magnetic field is shown in Fig. 6.

The amplifying operation of a device according to Fig. 5, as explained, is based upon a variation in the field strength of the magnetic field acting upon the semiconductor which, in turn, varies the thickness of the magnetic barrier layer. However, an amplifying operation by means of a magnetic barrier layer may also be produced with a constant field strength of the magnetic field. This example shows at the same time that the new device may be used with more than two electrodes. Such a semiconductor device with three electrodes is shown in Fig. 7.

Figure 7:
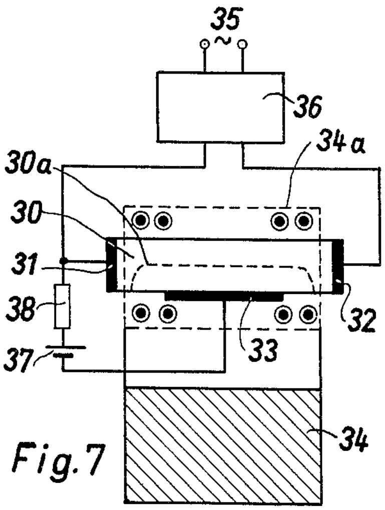

The semiconductor body 30 according to Fig. 7 has at its two end faces respective electrodes 31 and 32. A third electrode 33 is intimately joined with the semiconductor along a limited portion of only one of its longitudinal sides. The semiconductor is subjected to a magnetic field within the region surrounded by the broken line 34*a*. The magnetic field has a direction perpendicular to the plane of illustration, as is indicated by encircled dots in similarity to the corresponding representation used in Fig. 1. The field strength of the magnetic field may be constant and is produced, for instance, by a permanent magnet 34. An alternating-voltage source 35 and a control circuit 36 are connected to the electrodes 31 and 32 of the semiconductor body 30. The control circuit 36 may be given various designs depending upon the desired application and not essential to the invention proper, it being understood that the output voltage of circuit 36 is variable and serves to control another circuit. This controlled circuit comprises a direct current source 37 and a load 38 series connected between the electrodes 31 and 33 of the semiconductor.

The variations of the control energy in the control circuit are translated into corresponding amplified variations of the current flowing in the controlled circuit. With a suitable choice of the dimensions and physical properties of the semiconductor 30 an amplifying ratio far above unity can be attained, although it is, of course, also possible to make the amplification ratio equal to unity or smaller.

The device according to Fig. 7 functions as follows. A constant magnetic field, as such, results in the formation of a magnetic barrier layer of a definite effective thickness as explained above with reference to Fig. 1. As also explained, the magnetic barrier layer within the semiconductor depends upon the exterior magnetic field acting simultaneously with a driving voltage which is applied to the semiconductor in its longitudinal direciton, i. e. transverse or perpendicular to the magnetic field direction. The thickness of the magnetic barrier layer is dependent upon the magnetic field strength and upon the electric field strength. Consequently, if, as here assumed, the magnetic field strength is constant, the thickness of the magnetic barrier layer may nevertheless be varied by varying the electric voltage impressed upon the semiconductor. It follows that the thickness of the magnetic barrier layer in the semiconductor 30 of Fig. 7 varies in accordance with the variations of the voltage applied to the semiconductor by the controlling circuit. This thickness, in turn, determines the resistance effective within the semi-conductor between the electrodes 31 and 33 in the controlled circuit of load 38. Consequently, the variations in control voltage are translated into corresponding current variations in the controlled circuit.

In Fig. 7 the boundary of the magnetic barrier layer, as defined above, is schematically indicated by a broken line 30*a*. It will be apparent that the electrode 33 must not be made too long to prevent it from shorting the semi-conductor.

Figure 8:
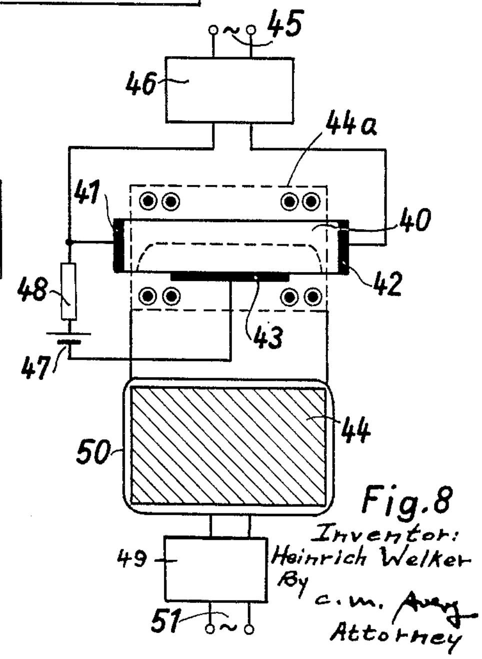

By comparison, a device of the type according to Fig. 5 produces the intended effect by a variation of the magnetic field strength, while a device of the type shown in Fig. 7 provides a similar effect by a variation of the electric field strength. Both types of control may be combined with each other, thus providing a device in which the magnetic field strength and the electric field strength are both varied for correspondingly varying the thickness of the magnetic barrier layer to attain the desired control or translating effect. Such a combined-action device in its simplest form is shown in Fig. 8. Three electrodes 41, 42, and 43 are attached to the semiconductor 40. An electromagnet 44 is used instead of a constant or permanent magnet. The magnetic field strength in the area 44*a* is controlled by the control device 49 which is connected to the alternating-voltage source 51 and acts on the coil 50 of the electromagnet. The electric field, on the other hand, is controlled as has been explained in the example shown in Fig. 7, by a control circuit 46 which is connected to an alternating-voltage source 45. Such a device offers the possibility of having two controlling magnitudes jointly act upon the semiconductor. Consequently, the circuit to be controlled may then be subjected to the control effects of two control circuits which may be independent from each other.

Instead of providing the semiconductor with one additional electrode 33 as shown in Figs. 7 and 8, two or more such electrodes may be provided in addition to the two terminal electrodes of the semiconductor, so that the number of the controlled circuits may be made larger than one.

In a device of the type shown in Fig. 5 a peculiar phenomenon may be observed. While in such devices the circuit to be controlled is primarily subjected to control by field-strength variation of the magnetic field, the current variations thus produced in the controlled circuit of load 16 act in the same sense as the variations of the magnetic field. In other words the current variations in the controlled circuit augment the thickness variations of the magnetic barrier layer. Hence, the device exhibits a kind of feed back coupling, or more accurately an intermediate feed back effect.

I claim:

1. An electrical semiconductor device, comprising a crystalline semiconductor body of substantially intrinsic conductance having an elongated shape, two metallically conductive electrodes mounted on said body at the respective two longitudinal ends thereof, said body having two differently textured surface areas substantially opposite to each other and extending in the longitudinal direction of said body intermediate said two electrodes, one of said two areas having an etched surface texture for reduced surface recombination, and said other area having a polished surface texture for increased surface recombination.

2. In a device according to claim 1, said semiconductor body consisting essentially of a crystalline and homopolar semiconductor substance having an excess-electron and defect-electron mobility above 100 $cm.^2$/volt sec.

3. A semiconductor device of non-linear current-voltage characteristic, comprising magnetic field means, a resistance body of crystalline intrinsic semiconductor material disposed in the magnetic field of said field means, electric field means having in said body an electric field of a direction intersecting the direction of said magnetic field and said body having a surface zone substantially parallel to said electric field direction, whereby electron-hole pairs are displaced by said magnetic field away from said surface zone, said zone having lesser surface recombination than required for replenishing the displaced pairs so as to be depleted of electron-hole pairs when the device is in operation, said semiconductor body having two electrodes spaced from each other in the direction of said electric field, said zone being located between said two electrodes, a load circuit extending through said semiconductor body and through at least one of said two electrodes, said circuit comprising current-supply means and a load member to be energized from said current-supply means in response to resistance variation of said body.

4. A semiconductor device of non-linear current-voltage characteristic, comprising magnetic field means, a crystalline intrinsic semiconductor body disposed in the magnetic field of said field means, electric field means having in said body an electric field of a direction intersecting the direction of said magnetic field, at least one of said two field means comprising an electric control circuit having means for varying the field strength, said body having parallel to said electric field direction a surface zone substantially at a location whence said magnetic field causes displacement of electron-hole pairs, said surface zone having lesser surface recombination than required for replenishing the displaced pairs so as to be depleted of electron-hole pairs when the device is in operation, said semiconductor body having two electrodes spaced from each other in the direction of said electric field and said zone being located between said two electrodes, current-supply means and a load member connected in series with each other between said two electrodes for energizing said load member from said current-supply means in response to the resistance variation of said body caused by variation of said field strength.

5. A semiconductor device of non-linear current-voltage characteristic, comprising a monocrystalline resistance body of homopolar semiconductor material having an electron and hole mobility of at least 100 cm.$^2$/volt second, said semiconductor body being disposed in the field of said magnetic field means, electric field means having in said body an electric field of a direction intersecting the direction of said magnetic field and said body having a surface zone substantially parallel to said electric field direction, whereby electron-hole pairs are displaced by said magnetic field away from said surface zone, said zone having lesser surface recombination than required for replenishing the displaced pairs, said semiconductor body having two electrodes spaced from each other in the direction of said electric field, said zone being located between said two electrodes, a load circuit extending through said semiconductor body and through at least one of said two electrodes, said circuit comprising current-supply means and a load member to be energized from said current-supply means in response to resistance variation of said body.

6. A semiconductor device of non-linear current-voltage characteristic, comprising magnetic field means, a resistance body of crystalline intrinsic semiconductor material disposed in the magnetic field of said field means, electric field means having in said body an electric field of a direction intersecting the direction of said magnetic field and said body having a surface zone substantially parallel to said electric field direction, whereby electron-hole pairs are displaced by said magnetic field away from said surface zone, said zone having rough surface texture as compared with polished mirror finish whereby its surface recombination is lower than required for replenishing the displaced electron-hole pairs, said semiconductor body having two electrodes spaced from each other in the direction of said electric field, said zone being located between said two electrodes, a load circuit extending through said semiconductor body and through at least one of said two electrodes, said circuit comprising current-supply means and a load member to be energized from said current-supply means in response to resistance variation of said body.

7. In a semiconductor device according to claim 6, the entire surface of said semiconductor body between said terminals having said rough surface texture.

8. A semiconductor device of non-linear current-voltage characteristic, comprising magnetic field means, a resistance body of crystalline intrinsic semiconductor material disposed in the magnetic field of said field means, electric field means having in said body an electric field of a direction intersecting the direction of said magnetic field, said body having two opposite surfaces both extending substantially in the direction of said electric field, one of said two surfaces having polished texture for high surface recombination, said other surface having etched texture for reduced surface recombination, said semiconductor body having two electrodes spaced from each other in the direction of said electric field, a load circuit extending through said semiconductor body and through at least one of said two electrodes, said circuit comprising current-supply means and a load member to be energized from said current-supply means in response to resistance variation of said body.

9. An electrical semiconductor device, comprising a crystalline intrinsic semiconductor body and two metallically conductive electrodes connected with said body at opposite respective sides thereof, said body having two differently textured surface areas extending between said electrodes at opposite sides respectively of said body to provide at said areas an increased and a decreased surface recombination respectively, current supply means connected to said electrodes, magnetic field means having in said body a field direction transverse to the spacing direction of said electrodes, and a load member having a circuit extending through said body and through at least one of said electrodes.

10. A semiconductor device of non-linear current-voltage characteristic, comprising a magnetic field structure having a field gap and having control means for varying the field strength of said gap, a resistance body of intrinsic semiconductor material disposed in said gap, said body having two electrodes spaced from each other in a direction transverse to the direction of the magnetic field in said gap whereby said field causes displacement of the charge carriers in said body toward one side thereof, said body having between said electrodes an area of lower surface recombination than required for replenishing the displaced charge carriers, a load circuit extending through said body and through at least one of said two electrodes, said load circuit comprising current supply means and a load member energized from said supply means through said body in dependence upon variations of said magnetic field strength.

11. A semiconductor device of non-linear current-voltage characteristic, comprising magnetic field means, a crystalline intrinsic semiconductor body disposed in the magnetic field of said field means, said body having two electrodes spaced from each other in a direction transverse to the direction of the magnetic field in said body, an electric circuit extending through said electrodes and said body, said circuit having variable-current supply means for producing in said body an electric field of variable strength whereby said two fields cause displacement of the charge carriers in said body toward one side thereof, said body having between said electrodes an area of lower surface recombination than required for replenishing the displaced charge carriers, and load means connected with said body through at least one of said electrodes and responsive to change in resistance occurring in said body in dependence upon said variable electric field strength.

12. A semiconductor device of non-linear current-voltage characteristic, comprising a magnetic field structure having a field gap and having control means for varying the field strength of said gap, a resistance body of intrinsic semiconductor material disposed in said gap, said body having two electrodes spaced from each other in a direction transverse to the direction of the magnetic field, and electric circuit extending through said electrodes and said body, said circuit having variable-current supply means for producing in said body an electric field of variable strength whereby said two fields cause displacement of the charge carriers in said body toward one side thereof, said body having between said electrodes an area of lower surface recombination than required for replenishing the displaced charge carriers, and load means connected with said body through at least one of said electrodes and responsive to change in resistance occurring in said body in dependence jointly upon variation of said magnetic and electric field strengths.

13. An electric semiconductor device, comprising an intrinsic semiconductor body and two mutually spaced terminal electrodes joined with said body and at least one other electrode joined with said body and located between said two terminal electrodes, and electric circuit connected with said two terminal electrodes and having current supply means for passing current through said body, magnetizing means having magnetic field in which said body is located and having in said body a field direction transverse to the flow of said current, said body having due to said current and said field a zone of increased resistance extending between said two terminal electrodes along one side of said body, and a controlled circuit connected to said other electrode and extending through a portion of said body including said zone, said controlled circuit comprising a load member and current supply means for energizing said load member in response to resistance variation in said body.

14. An electric semiconductor device, comprising a magnetic field structure having a gap, a semiconductor body disposed in said gap to be traversed by the magnetic field of said structure, said body having two terminal electrodes spaced from each other in a direction transverse to said field, an excitation circuit inductively linked with said structure and having variable current supply means for controlling said field, a load circuit connected across said electrodes and having variable current supply means for passing current through said body, and a load member connected in said load circuit to be energized from said latter supply means in joint dependence upon current variation of said two current supply means.

15. In a semiconductor device according to claim 3, said magnetic field means comprising a field structure having a permanent magnet for constant field excitation and having a field gap in which said resistance body is located, and said electric field means comprising an electric circuit having a source of variable current for controlling the resistance variation of said body.

16. An electric semiconductor device, comprising a magnetizable field structure having a gap, a variable-current excitation circuit inductively linked with said structure for controlling the magnetic field, a resistance body of crystalline semiconductor material located in said gap to be traversed by the magnetic field, said body having two terminal electrodes spaced from each other in a direction transverse to said magnetic field, variable-current supply means connected to said terminal electrodes to pass current through said body, and a load member having a circuit extending through said body and through at least one of said terminal electrodes, said body forming a variable resistance in said load circuit.

17. In a semiconductor device according to claim 3, said magnetic field means comprising a field structure, a coil on said structure and a control circuit including said coil; said electric field means being formed by said load circuit, and said current supply means having alternating voltage, whereby said semiconductor body substantially prevents current flow through said load member during one of the two half-wave periods of said alternating voltage depending upon the concurrent voltage polarity of said control circuit.

18. A semiconductor device, comprising a magnetic-field structure having a gap and having an excitation coil and a control circuit including said coil for controlling the magnetic field in said gap, a resistance body of crystalline intrinsic semiconductor material disposed in said gap to be subjected to said field having two terminal electrodes spaced from each other in a direction transverse to said field, an alternating-current circuit connected to said electrodes and extending through said body, a circuit member to be controlled, said member being connected in said latter circuit, said body having a surface zone extending substantially parallel to said electrode-spacing direction and substantially parallel to the direction of said magnetic field, said zone having a sufficiently rough surface texture to cause occurrence of asymmetrical conductance in said body for a given polarity relation of said magnetic field and said current.

19. A semiconductor device, comprising a magnetic-field structure having a gap and having an excitation coil and a control circuit including said coil for controlling the magnetic field in said gap, a resistance body of crystalline intrinsic semiconductor material disposed in said gap to be subjected to said field having two terminal electrodes spaced from each other in a direction transverse to said field, an alternating-current circuit connected to said electrodes and extending through said body, a circuit member to be controlled, said member being connected in said latter circuit, said body having two opposite surfaces both extending in said electrode-spacing direction and substantially parallel to the direction of said magnetic field, said two surfaces having respectively different surface textures, one of said surfaces having a polished finish, the other having etched finish to cause occurrence of asymmetrical conductance in said body for a given polarity relation of said magnetic field and said current.

References Cited in the file of this patent

UNITED STATES PATENTS

| | | |
|---|---|---|
| 543,843 | Biggar | Aug. 6, 1895 |
| 2,551,265 | Hansen, Jr. | May 1, 1951 |

OTHER REFERENCES

Publications: "Semi-Conductors" by D. A. Wright (1950) New York, John Wiley and Sons, Inc. page 75 relied on.

"Non-Rectifying Germanium," Physical Review (vol. 72, p. 974).